United States Patent Office 2,847,291
Patented Aug. 12, 1958

2,847,291

GELATIN DYNAMITE EXPLOSIVES CONTAINING WATER

Takehisa Sakurai, Tokyo, Japan

No Drawing. Application May 9, 1956
Serial No. 583,615

5 Claims. (Cl. 52—5)

This invention relates to gelatin dynamite explosives.

Gelatin dynamite explosives have hitherto contained a gel consisting of nitro-cellulose dissolved in nitroglycerine in an amount up to more than 20% by weight of total explosive, as one of the most suitable plasticizers mixed with finely divided solid ingredients such as ammonium nitrate, saltpeter or wood meal.

Such an amount of nitrocellulose-nitroglycerine gel in the explosive however is liable to cause accidental explosion in the course of manufacture, handling, or transportation, because of the high sensitiveness of nitroglycerine-nitrocellulose gelatin dynamite.

An object of the invention is to lower the cost of production of plastic gel explosives by employing konjac mannan gel, as hereinafter defined, as a plasticizer of exceedingly low initial cost as compared with nitroglycerine gel used hitherto.

The use of water contained in the said konjac mannan gel as desensitizer is another object of the invention.

In the present invention the explosives produced with varying amounts of konjac mannan gel differ correspondingly in their sensitiveness.

Konjac mannan is a mannan contained in the tuber of konjac (*Amorphaphalas konjac* k. koch) which belongs to the Araceae that is produced exclusively in the Orient. Konjac mannan is marketed in powder form. It absorbs water to over 12 times its weight to form a hydrogel and swells. Further, as the water content is increased, the konjac mannan becomes viscous and adhesive, and finally an aqueous solution. The gel is coagulated with lime so as to make it edible, and the gel may also be used as an adhesive for special purposes.

In the process of this invention wherein powdered konjac mannan is employed, water is added in the amount of 12 times, and preferably 8 to 12 times the weight of the powdered konjac mannan. The swollen material thus obtained, is then kneaded with other ingredients.

According to the present invention, konjac mannan gel is used in place of part of the gel consisting of nitrocellulose dissolved in nitroglycerine in a gelatin dynamite explosive composition, which composition generally includes nitroglycerine-nitrocellulose gel and other nitrocompounds, ammonium nitrate or saltpeter as an oxygen-supplying agent and wood meal or starch, as a combustible agent. In the present invention where konjac mannan gel is used principally as a plasticizing agent, the preferred proportion of konjac mannan gel ranges from 2 to 4% by weight as compared with 14 to 22% by weight of nitrocellulose gel in the explosive. When konjac mannan gel is used for both plasticizing and desensitizing purposes the preferred proportion is from 8 to 10% by weight as compared with 20 to 25% of nitroglycerine-nitrocellulose gel.

The hydro-gel of konjac mannan employed in the present invention is distinguished from materials such as cereal flour gelatinized with water, Arabian gum, agar-agar which materials have already been used in explosive mixtures by the fact that the hydro-gel can be obtained by merely admixing konjac mannan with water at ordinary temperatures, whereas the latter mentioned materials have to be subjected to boiling before use. This property of konjac mannan can apparently furnish a remarkable advantage when carrying out the present invention on an industrial scale.

Furthermore, konjac mannan can be converted into a gel by means of a small quantity of water, the gel so produced remaining unchanged, thus keeping the explosive plastic for a long time period.

In order to illustrate the present invention, the following examples will be given, wherein the properties of low nitro gelatin dynamite explosives made according to this invention are compared with those produced by the usual processes.

In the following tables "A" denotes a plastic gelatin dynamite explosive of ordinary sensitivity having been given sufficient plasticity with konjac mannan gel, and "B" represents such explosive provided with additional plasticity together with increased insensitiveness, i. e., so insensitive that it could not explode, even when attempts are made to detonate the explosive with the envelope opened; by means of a number of percussion caps. It is only by filling or enclosing the explosive in an iron tube and by using 100 gr. of ordinary dynamite, that the explosive can be detonated, "C" denotes an ordinary gelatin dynamite explosive not according to the invention.

*Composition of explosives*

|  | A (kg.) | B (kg.) | C (kg.) |
|---|---|---|---|
| Nitroglycerine gel and nitrocellulose | 18.0 | 22.0 | 30.0 |
| Ammonium nitrate | 69.0 | 57.2 | 63.0 |
| Saltpeter | 5.0 | 5.0 |  |
| Starch [1] | 1.5 | 1.8 | 2.0 |
| Wood meal [1] | 0.5 | 5.0 | 4.0 |
| Naphthalene [1] | 3.0 | 1.0 | 1.0 |
| Konjac mannan gel | 3.0 | 8.0 |  |

[1] Combustible materials.

*Properties of the above explosives*

|  | A | B | C |
|---|---|---|---|
| Detonation primed in the open with: |  |  |  |
| percussion caps 1 | E | 5N | 5E |
| percussion caps 10 | E | 5N | 5E |
| percussion caps 20 | E | 5N | 5E |
| Detonation volocity m./s. in an iron tube | 5,500 | 5,100 | 5,000 |
| Specific gravity | 1.49 | 1.5 | 1.49 |

E: exploded.
N: not exploded.

It is to be understood that the effectiveness of the explosives obtained according to the present invention is by no means inferior to the usual explosives.

Although the details of the invention have been hereinbefore described, it should be understood that various modifications may be made within the scope of the following claims.

This is a continuation-in-part of application Serial No. 227,738, filed May 22, 1951.

What I claim and desire to protect by Letters Patent is:

1. A gelatin dynamite explosive composition comprising an oxygen-supplying agent, a combustible material and konjac mannan gel present in the amount of 2 to 4% by weight of the composition, said gel consisting of powdered konjac mannan and 8 to 12 times the weight thereof of water.

2. A gelatin dynamite explosive composition comprising an oxygen-supplying agent, a combustible material and konjac mannan gel as a plasticizer and desensitizing agent present in the amount of 8 to 10% by weight of said composition, said gel consisting of powdered konjac mannan and 8 to 12 times the weight thereof of water.

3. A gelatin dynamite explosive comprising nitrocellulose dissolved in glycerine and konjac mannan gel consisting of powdered konjac mannan and 8 to 12 times the amount thereof, by weight, of water, said konjac mannan gel being present in an amount from 3 to 8% by weight of the total composition.

4. A gelatin dynamite explosive composition comprising 20 to 25%, by weight, of a gel of nitrocellulose dissolved in glycerine, an oxygen-supplying composition selected from the group consisting of ammonium nitrate and sodium nitrate, combustible material selected from a group consisting of wood meal and starch and 8 to 10%, by weight, of konjac mannan gel consisting of powdered konjac mannan and 8 to 12 times the weight thereof of water.

5. A gelatin dynamite explosive composition comprising 14 to 22%, by weight, of nitrocellulose dissolved in glycerine, an oxygen-supplying agent selected from the group consisting of ammonium nitrate and saltpeter, a combustible agent selected from the group consisting of wood meal and starch, and konjac mannan gel in an amount from 2 to 4% by weight of the total composition and consisting of powdered konjac mannan and water in an amount equivalent to 8 to 12 times the amount by weight of the konjac mannan.

References Cited in the file of this patent

UNITED STATES PATENTS

| | | |
|---|---|---|
| 1,741,146 | Babcock | Dec. 31, 1929 |
| 2,231,044 | Winning | Feb. 11, 1941 |
| 2,314,806 | Winning | Feb. 11, 1941 |
| 2,314,807 | Winning | Feb. 11, 1941 |
| 2,314,808 | Winning | Feb. 11, 1941 |
| 2,314,809 | Winning | Feb. 11, 1941 |
| 2,314,810 | Winning | Feb. 11, 1941 |
| 2,314,832 | Kirst et al. | Feb. 11, 1941 |
| 2,654,666 | Taylor | Oct. 6, 1953 |

FOREIGN PATENTS

| | | |
|---|---|---|
| 10,312 | Great Britain | of 1889 |
| 645,039 | Great Britain | Oct. 27, 1950 |